(12) United States Patent
Levine et al.

(10) Patent No.: US 11,014,189 B2
(45) Date of Patent: May 25, 2021

(54) METHOD TO CONTROL ADDITIVE MANUFACTURING BUILDS USING LASER ANGLE OF INCIDENCE

(71) Applicant: GENERAL ELECTRIC COMPANY, Schenectady, NY (US)

(72) Inventors: Rachel Wyn Levine, Cincinnati, OH (US); Christian Stevenson, Blanchester, OH (US); Justin Mamrak, Loveland, OH (US); MacKenzie Ryan Redding, Mason, OH (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 257 days.

(21) Appl. No.: 15/990,142

(22) Filed: May 25, 2018

(65) Prior Publication Data

US 2019/0358736 A1    Nov. 28, 2019

(51) Int. Cl.
*B23K 15/00* (2006.01)
*B33Y 10/00* (2015.01)
(Continued)

(52) U.S. Cl.
CPC ........ *B23K 15/0086* (2013.01); *B23K 15/002* (2013.01); *B23K 15/0013* (2013.01);
(Continued)

(58) Field of Classification Search
CPC .............. B23K 15/0086; B23K 15/002; B23K 15/0013; B23K 26/14; B23K 26/144;
(Continued)

(56) References Cited

U.S. PATENT DOCUMENTS

| | | |
|---|---|---|
| 4,863,538 A | 9/1989 | Deckard |
| 5,460,758 A | 10/1995 | Langer et al. |

(Continued)

FOREIGN PATENT DOCUMENTS

| | | |
|---|---|---|
| EP | 2760623 A1 | 8/2014 |
| EP | 2828020 A1 | 1/2015 |

(Continued)

OTHER PUBLICATIONS

Syed et al., "Effects of wire feeding direction and location in multiple layer diode laser direct metal deposition", Applied Surface Science, vol. 248, Issue: 1-4, pp. 518-524, Jul. 30, 2005.

(Continued)

*Primary Examiner* — Brian W Jennison
(74) *Attorney, Agent, or Firm* — Dority & Manning, P.A.

(57) ABSTRACT

The present disclosure generally relates to methods of additive manufacturing with control of the energy beam incidence angle that allows for aligning the laser beam angle to directly oppose the building direction of an angled wall. The method includes building an object in an additive manufacturing powder bed where the object includes a surface that is defined by a build vector projecting outward relative to the build plate center at an angle $\Phi$ relative to normal of the build plate such that $90°>\Phi>0°$ and the directed energy beam forms an angle $\theta_{L2}$ relative to normal of the build plate such that $270°>\theta_{L2}>180°$, wherein $\theta_{L2}-\Phi=180°\pm\Delta$, and $\Delta<45°$. The present methods provide finished objects having overhanging regions with more consistent surface finish and resistance to mechanical strain or stress.

17 Claims, 3 Drawing Sheets

(51) Int. Cl.
 *B33Y 50/02* (2015.01)
 *B23K 26/342* (2014.01)
(52) U.S. Cl.
 CPC ............ *B23K 26/342* (2015.10); *B33Y 10/00* (2014.12); *B33Y 50/02* (2014.12)
(58) Field of Classification Search
 CPC ............ B23K 26/1476; B23K 26/0884; B23K 26/342; B22F 3/105; B22F 3/1055; B22F 7/062; B29C 67/0077; B29C 67/0088; B29C 67/0092
 See application file for complete search history.

(56) References Cited

U.S. PATENT DOCUMENTS

| | | | |
|---|---|---|---|
| 6,046,426 | A | 4/2000 | Jeantette et al. |
| 6,144,008 | A | 11/2000 | Rabinovich |
| 8,247,733 | B2 | 8/2012 | Zhu |
| 2003/0206820 | A1 | 11/2003 | Keicher et al. |
| 2007/0175875 | A1* | 8/2007 | Uckelmann ........ A61C 13/0013 219/121.85 |
| 2012/0132627 | A1 | 5/2012 | Wescott et al. |
| 2017/0001379 | A1* | 1/2017 | Long .................... B23K 26/702 |
| 2017/0014904 | A1 | 1/2017 | Brown et al. |
| 2017/0021455 | A1* | 1/2017 | Dallarosa ............. B29C 64/268 |
| 2017/0106477 | A1 | 4/2017 | Mironets et al. |
| 2017/0120387 | A1 | 5/2017 | Demuth et al. |
| 2017/0146488 | A1 | 5/2017 | Gold et al. |
| 2017/0232518 | A1* | 8/2017 | Shi ........................ B22F 3/1055 419/7 |
| 2017/0246810 | A1 | 8/2017 | Gold |
| 2017/0282246 | A1 | 10/2017 | Liebl et al. |
| 2017/0282455 | A1* | 10/2017 | DeFelice ................ B33Y 50/00 |

FOREIGN PATENT DOCUMENTS

| | | |
|---|---|---|
| EP | 3181272 A1 | 6/2017 |
| EP | 3225334 A1 | 10/2017 |

OTHER PUBLICATIONS

Zhang et al., "Study on Scanning Pattern during Laser Metal Deposition Shaping", 2009 Second International Conference on Intelligent Computation Technology and Automation, pp. 668-671, Changsha, Hunan, Oct. 10-11, 2009.
3devo, Why are 3D Metal Printers So Tall? Jan. 1, 2018, 8 pages.
Shi Tuo et al., "Laser metal deposition with spatial variable orientation based on hollow-laser beam with internal powder feeding technology.", Optics and Laser Technology, vol. 88, Sep. 28, 2016, pp. 234-241 (Abstract Only).
International Search Report Corresponding to Application No. PCT/US2019/033906 dated Sep. 9, 2019.

* cited by examiner

METHOD TO CONTROL ADDITIVE MANUFACTURING BUILDS USING LASER ANGLE OF INCIDENCE

INTRODUCTION

The present disclosure generally relates to methods for additive manufacturing using powder-based build materials. More specifically, the disclosure relates to methods of irradiating a build area in order to improve build quality.

BACKGROUND

Additive manufacturing (AM) or additive printing processes generally involve the buildup of one or more materials to make a net or near net shape (NNS) object, in contrast to subtractive manufacturing methods. Though "additive manufacturing" is an industry standard term (ASTM F2792), AM encompasses various manufacturing and prototyping techniques known under a variety of names, including freeform fabrication, 3D printing, rapid prototyping/tooling, etc. AM techniques are capable of fabricating complex components from a wide variety of materials. Generally, a freestanding object can be fabricated from a computer aided design (CAD) model. A particular type of AM process uses electromagnetic radiation such as a laser beam, to melt or sinter a powdered material, creating a solid three-dimensional object. Power-based methods such as direct metal laser melting (DMLM) and selective laser melting (SLM) have been used to produce objects for a variety of industries.

Selective laser sintering, direct laser sintering, selective laser melting, and direct laser melting are common industry terms used to refer to producing three-dimensional (3D) objects by using a laser beam to sinter or melt a fine powder. For example, U.S. Pat. Nos. 4,863,538 and 5,460,758 describe conventional laser sintering techniques. More accurately, sintering entails fusing (agglomerating) particles of a powder at a temperature below the melting point of the powder material, whereas melting entails fully melting particles of a powder to form a solid homogeneous mass. The physical processes associated with laser sintering or laser melting include heat transfer to a powder material and then either sintering or melting the powder material. Although the laser sintering and melting processes can be applied to a broad range of powder materials, the scientific and technical aspects of the production route, for example, sintering or melting rate and the effects of processing parameters on the microstructural evolution during the layer manufacturing process have not been well understood. This method of fabrication is accompanied by multiple modes of heat, mass and momentum transfer, and chemical reactions that make the process very complex.

An example of an apparatus for AM using a powdered build material is shown in FIG. 1. The apparatus 100 builds objects or portions of objects, for example, the object 129, in a layer-by-layer manner by sintering or melting a powder material (not shown) using an energy beam 136 generated by a source 120, which can be, for example, a laser for producing a laser beam, or a filament that emits electrons when a current flows through it. The powder to be melted by the energy beam is supplied by reservoir 126 and spread evenly over a powder bed 112 using a recoater arm 116 travelling in direction 134 to maintain the powder at a level 118 and remove excess powder material extending above the powder level 118 to waste container 128. The energy beam 136 sinters or melts a cross sectional layer of the object being built under control of an irradiation emission directing device, such as a laser galvo scanner 132. The galvo scanner 132 may comprise, for example, one or more movable mirrors or scanning lenses. The speed at which the energy beam is scanned is a critical controllable process parameter, impacting the quantity of energy delivered to a particular spot. Typical energy beam scan speeds are on the order of 10 to several thousand millimeters per second. The build platform 114 is lowered and another layer of powder is spread over the powder bed and object being built, followed by successive melting/sintering of the powder by the laser 120. The powder layer is typically, for example, 10 to 100 microns in thickness. The process is repeated until the object 129 is completely built up from the melted/sintered powder material. The energy beam 136 may be controlled by a computer system including a processor and a memory (not shown). The computer system may determine a scan pattern for each layer and control energy beam 136 to irradiate the powder material according to the scan pattern. After fabrication of the object 129 is complete, various post-processing procedures may be applied to the object 129. Post-processing procedures include removal of excess powder by, for example, blowing or vacuuming. Other post processing procedures include a stress relief heat treat process. Additionally, thermal and chemical post processing procedures can be used to finish the object 129.

For objects 129 containing a surface 121 projecting outward relative to base 127 on the build plate 114 at an angle Φ relative to the normal of build plate 114 (i.e., normal line 171), surface 121 creates an overhang, i.e., at point 124 in uppermost layer 125. The surface 121 may be considered to be defined by a build vector projecting outward relative to the build plate 114 center and at an angle Φ relative to the normal line 171, wherein 90°>Φ>0°. The directed energy beam 136 may also be considered to be defined by an energy beam vector projecting inward relative to the build plate 114. At the lateral center of the build plate 114, energy beam 136 lines up with the build plate normal to form angle $\theta_{L1}$ between energy bean 136 and the normal line, where $\theta_{L1}=180°$. However, at points laterally removed from the center, the angle $\theta_{L1}$ decreases, as shown for point 124, where $\theta_{L1}<180°$. The wider the object 129 is in the y-direction, the smaller the angle $\theta_{L1}$ directed energy beam vector 136 is oriented from normal line N. In turn, the smaller angle $\theta_{L1}$ is than 180°, the less completely fused the object will be at the corresponding point(s). Incomplete fusion may result in imperfections such as rough surface finish and structural weakness. The tolerance for deviation from 180° will depend on the build material.

U.S. Pat. No. 6,144,008 ("the '008 patent") describes a system using a moving stage to position the laser beam, focusing lens, and gas nozzle assembly relative to a feedstock delivery system. In large configurations, the product-holding stage may be kept stationary while the laser beam and feedstock delivery system move and/or rotate. However, the '008 patent uses a flat, solid feedstock, which it describes as having full density, compared to powder sintered materials where porosity is always present. In addition, the '008 patent does not address the construction of overhang structures where both build platform and irradiation emission directing device (and/or energy source) are laterally stationary.

U.S. Pat. No. 6,046,426 ("the '426 patent") describes a system introducing a converging stream of powdered material at an angle as nearly normal to the work surface as possible, and at or near the minimum laser beam diameter. The delivery system directs the powdered material to flow in a converging, conical pattern, symmetrically injecting powdered material into the laser beam. However, several additive manufacturing apparatuses use powder beds with recoater mechanisms.

In view of the foregoing, in order to fully utilize the increased surface area of larger powder bed systems, there is a need for improved methods of irradiating powder beds at points laterally distant from the galvo scanner or energy source.

SUMMARY

The following presents a simplified summary of one or more aspects of the present disclosure in order to provide a basic understanding of such aspects. This summary is not an extensive overview of all contemplated aspects and is intended to neither identify key or critical elements of all aspects nor delineate the scope of any or all aspects. Its purpose is to present some concepts of one or more aspects in a simplified form as a prelude to the more detailed description that is presented later.

In one aspect, the present disclosure is directed to a method of fabricating an object, the method comprising (a) fusing at least a portion of a given layer of build material to form at least one fused region on or over a build plate by irradiation with a directed energy beam; (b) providing a subsequent layer of build material; and (c) repeating steps (a) and (b) until the object is formed; the object comprising a surface that is defined by a build vector projecting outward relative to the build plate center at an angle $\Phi$ relative to normal of the build plate such that $90°>\Phi>0°$ and the directed energy beam forms an angle $\theta_{L2}$ relative to normal of the build plate such that $270°>\theta_{L2}>1800$, wherein $\theta_{L2}-\Phi=180°\pm\Delta$, and $\Delta<45°$. The directed energy beam may be a laser beam or an electron beam. The build material can be a metal powder such as cobalt chrome. In some aspects, $\Delta<30°$. In some aspects, $\Delta<20°$. In some aspects, $\Delta<10°$. In some aspects, during the fabricating, $\Phi$ varies between subsequent layers. In some aspects, step (a) includes fusing at least a second portion of the given layer of build material to form at least a second fused region on or over a build plate by irradiation with a second directed energy beam.

In another aspect, the present disclosure is directed to a method of fabricating an object, the method comprising: (a) fusing at least a portion of a given layer of metal powder to form at least one fused region on or over a build plate by irradiation with a laser beam; (b) providing a subsequent layer of metal powder; and (c) repeating steps (a) and (b) until the object is formed; the object comprising a surface that is defined by a build vector projecting outward relative to the build plate center at an angle $\Phi$ relative to normal of the build plate such that $90°>\Phi>0°$ and the laser beam forms an angle $\theta_{L2}$ relative to normal of the build plate such that $270°>\theta_{L2}>180°$, wherein $\theta_{L2}-\Phi=180°\pm\Delta$, and $\Delta<45°$. In some aspects, $\Delta<30°$. In some aspects, $\Delta<20°$. In some aspects, $\Delta<10°$. In some aspects, the metal powder is cobalt chrome. In some aspects, during the fabricating, $\Phi$ varies between subsequent layers. In some aspects, step (a) includes fusing at least a second portion of the given layer of build material to form at least a second fused region on or over a build plate by irradiation with a second laser beam.

These and other aspects of the invention will become more fully understood upon a review of the detailed description, which follows.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known components are shown in block diagram form in order to avoid obscuring such concepts.

The present application is directed to methods for fixed bed large scale additive manufacturing with control of energy beam angle of incidence. According to the present disclosure, points in a given powder layer that are on the edge of the powder bed (such as an overhang in a vertically asymmetric object) are irradiated with a separate energy beam from that which irradiates points near the horizontal center of the powder layer. By irradiating edge points with a secondary energy beam, the surface finish is improved at these overhang points, resulting in a finished object with improved object life and/or improved resistance to stress especially at these overhang points.

As used herein, a directed energy beam angle of incidence is "substantially normal" to a surface if it irradiates the surface at a normal angle (i.e., 90°) or within ±45° of normal, such as within ±30° of normal, within ±15° of normal, within ±11°, within ±10°, within ±5°, within ±3°, or any integer or subrange in between. The tolerance for the deviation from normal will depend on the particular build material used and/or the particular application, and can be determined by persons of ordinary skill in the art. For example, an angle of incidence for cobalt chrome within 45° of normal may be sufficient.

Figure 1:
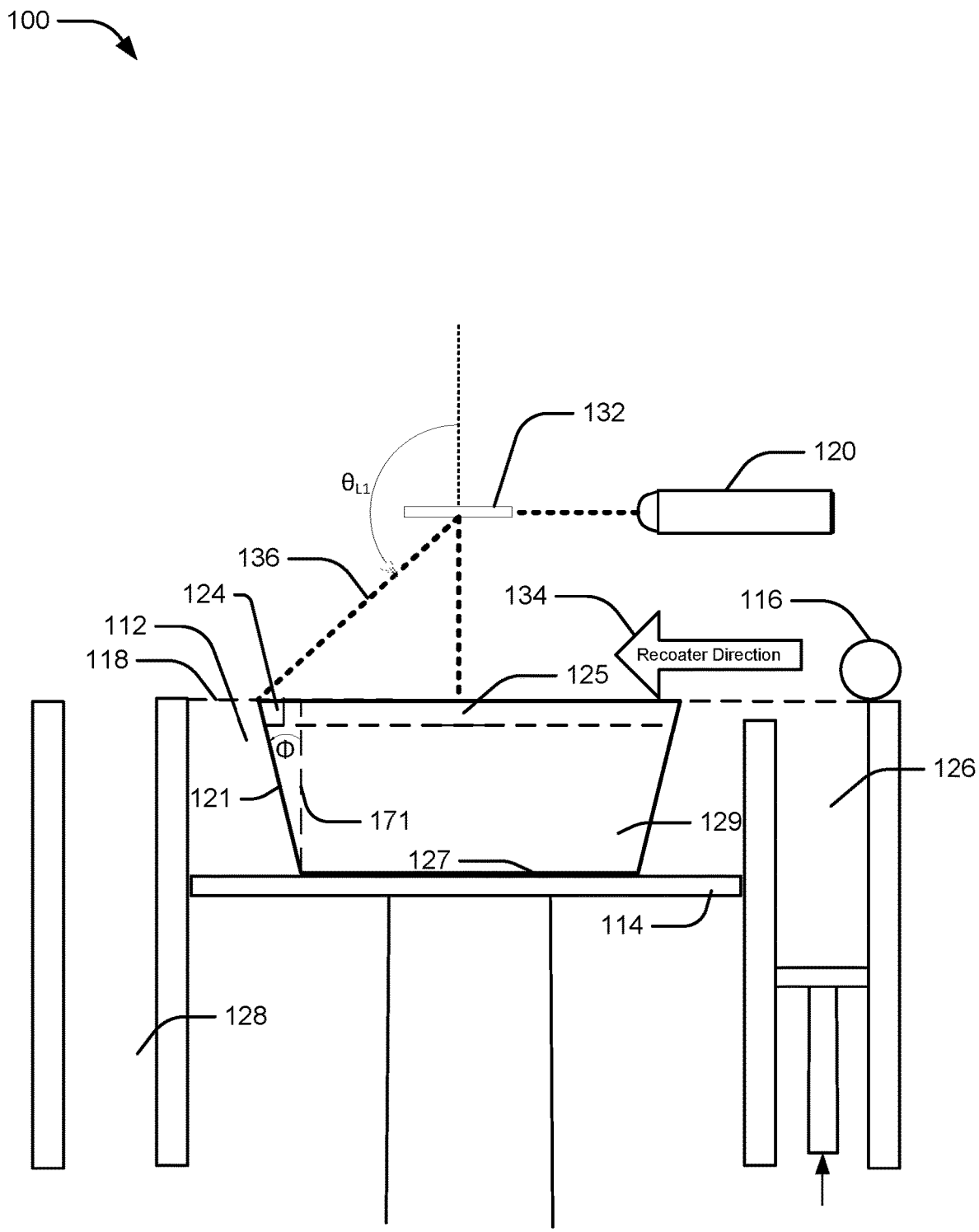
FIG. 1 shows a schematic diagram of an example of an apparatus for AM according to conventional methods.
Figure 2:
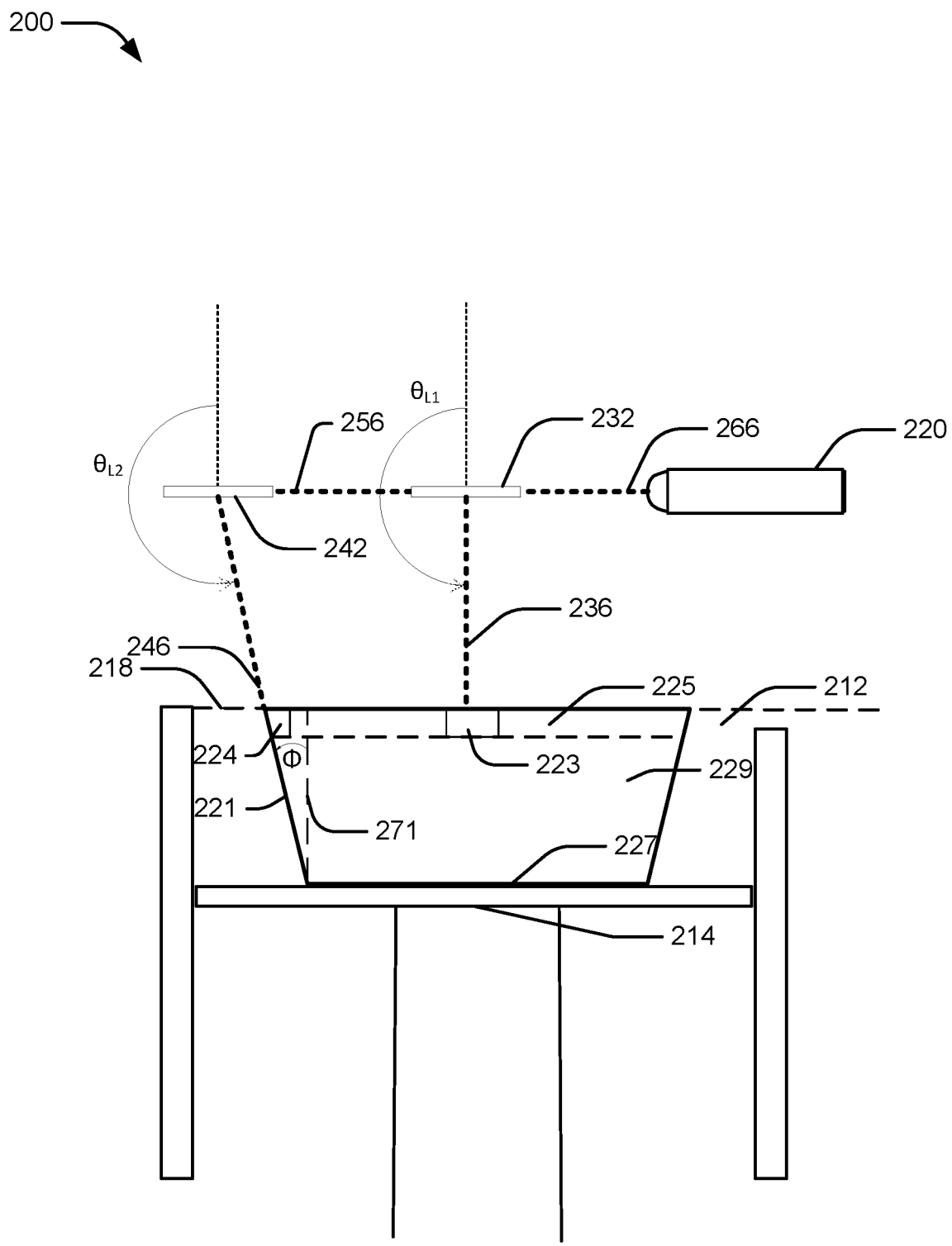
FIG. 2 shows a schematic diagram of energy beam angles of incidence during AM according to a first embodiment of the present disclosure.

FIG. 2 shows an exemplary apparatus according to an embodiment of the present disclosure. In this embodiment, apparatus 200 is an additive laser powder bed system, such as used for direct metal laser melting (DMLM). The apparatus comprises a laser source 220, a galvo scanner 232, powder bed 212, and build platform 214. Some aspects of a DMLM system, such as the powder reservoir and waste container, are not shown in FIG. 2. The first galvo scanner 232 is located above and near or at the center of the powder bed 212, and second galvo scanner 242 is located above and near or at an edge of the powder bed 212.

The apparatus of FIG. 2 is particularly well adapted to making objects 229 having overhanging surfaces 221. These surfaces may be described as projecting outward from the center of the build platform at an angle $\Phi$ relative to normal line 271. The surface 221 overhang is such that $0°<\Phi<90°$, and more usually the overhang is such that $\Phi<45°$, and in certain preferred embodiments $\Phi<30°$, 20°, 10°, or 5°.

When irradiating a given powder layer 225, first galvo scanner 232 is used to direct the first energy beam 236 to points 223 at or near the center of the powder bed that are below the first galvo scanner 232. The first laser beam 236 has an angle of incidence $\Theta_{L1}$ where $90°<\Theta_{L1}<2700$. More often $\Theta_{L1}$ is controlled within the range of about $135° < \Theta_L1 < 225°$. This range of beam angles $\Theta_{L1}$ is typical for conventional powder bed additive systems. At point 223 at or near the center of the powder bed, first beam 236 forms an angle $\theta_{L1}$ relative to the build plate normal such that $\theta_{L1}$ is at or near 1800. As points on the powder bed are irradiated in regions away from the center, the $\theta_{L1}$ forms angles that are ±45° from 180°.

When irradiating the given powder layer 225 at or near a point 224 proximal to the lateral edge of the powder bed, a second laser beam 246 directed by the second galvo scanner 242 is used. The second laser beam 246 has an angle of incidence $\Theta_{L2}$ such that $180° < \Theta_{L2} < 270°$. More typically, often $\Theta_{L2}$ is controlled within the range of about $180° < \Theta_{L2} < 225°$. The angle $\Theta_{L2}$ is ideally ±180° relative to the overhang angle Q. In this way the laser direction as it impacts the surface of the powder bed is directly opposite the direction of which the part overhang of the surface 221 is growing. Where $\Theta_{L2} - \Phi = 180° \pm \Delta°$, the process is ideally controlled to minimize Δ. In general Δ should be below 45°, and is preferably below 30°, more preferably below 20° and most preferably below 10°, or any subrange within these ranges. As will be evident to those of ordinary skill in the art, the actual value of A will depend on a variety of factors, including but not limited to, one or more of the size of the powder bed, and the lateral dimensions of the object relative to the powder bed, and/or the placement of second galvo scanner 242 relative to the powder bed 212.

Preliminary testing showed a 60% improvement in surface finish of the down-skin surface (i.e., surface 221) by putting the laser directly in line with the down-skin angle (i.e., $\Theta_{L2} - \Phi = 180°$), and a 25% improvement in up-skin surface finish (i.e., the horizontal surface at the top of the uppermost layer 225 of the finished object 229) by putting the laser directly in line with the up-skin angle (i.e., a 25% improvement in the finish at the upper surface of point 224).

In addition, the choice of build material may influence the acceptable limits on $\theta_{L1}$, and the choice of when to switch between first galvo scanner 232 and the second galvo scanner 242. Switching between first galvo scanner 232 and second galvo scanner 242 (and control of the beam splitter, if used) may be controlled by any suitable means known to persons of ordinary skill in the art, such as by a manual switch or using a computer. Computer-assisted switching may be manual or automated, using methods known to those of ordinary skill in the art.

In some aspects, apparatus 200 may contain a second energy source from which second galvo scanner 242 receives an energy beam 256. In some aspects, both first and second energy sources are laser sources. In some aspects, both first and second energy sources are electron beam sources. In aspects where the first and second energy source are electron beam sources, one or more deflector coils (not shown) may be used to modulate the first and second energy beams, (i.e., instead of first galvo scanner 232 and second galvo scanner 242).

Figure 3:
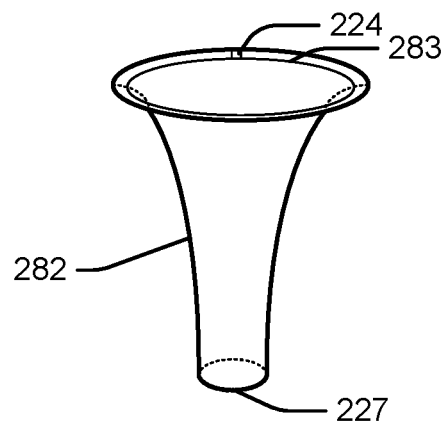
FIG. 3 shows a perspective view of an alternative shape of objects manufactured according to some embodiments of the present disclosure.

Although object 229 is shown in FIG. 2 as containing a surface 221 projecting from base 227 at a constant angle $\Phi$ outward relative to build platform 214, it is to be understood that object 229 is not limited to objects containing solid walls projecting outward relative to build platform 214 at a constant angle $\Phi$ toward point 224. FIG. 3 depicts an object that has an overhanging edge that includes an angle $\Phi$ defined as tangent to the surface that varies as the object is built up within the powder bed. Object 229 may have any shape with an overhang, including a shape that does not contain a wall connecting base 227 to point 224 in a straight line. As shown in FIG. 3, angle $\Phi$ varies with each given and subsequent layer of object 229 resulting in curved overhang. Suitable objects 229 may also be thin-walled, with outer surface 282 and inner surface 283 as shown in FIG. 3. In addition, the methods of the present disclosure are not limited to manufacture of objects that are laterally symmetric (i.e., objects having an axis of symmetry in the z-direction).

In addition, according to the methods of the present disclosure, $0° < \Phi < 90°$ and $180° < \theta_{L2} < 270°$, and the values of $\Phi$ and $\theta_{L2}$ may be independent of each other. In some aspects, $90° > \Phi > 0°$ and $270° > \theta_{L2} > 180°$, such as $255° > \theta_{L2} > 195°$, $240° > \theta_{L2} > 210°$, or $230° > \theta_{L2} > 220°$, or any integer or subrange in between. In some aspects, $75° > \Phi > 15°$ and $270° > \theta_{L2} > 180°$, such as $255° > \theta_{L2} > 195°$, or $240° > \theta_{L2} > 210°$, or $230° > \theta_{L2} > 220°$, or any integer or subrange in between. In some aspects, $60° > \Phi > 30°$ and $270° > \theta_{L2} > 180°$, such as $255° > \theta_{L2} > 195°$, or $240° > \theta_{L2} > 210°$, or $230° > \theta_{L2} > 220°$, or any integer or subrange in between. In some aspects, $50° > \Phi > 40°$ and $270° > \theta_{L2} > 180°$, such as $255° > \theta_{L2} > 195°$, or $240° > \theta_{L2} > 210°$, or $230° > \theta_{L2} > 220°$, or any integer or subrange in between. In some aspects, $270° > \theta_{L2} > 180°$ and $90° > \Phi > 0°$, such as $75° > \Phi > 15°$, or $60° > \Phi > 30°$, or $50° > \Phi > 40°$, or any integer or subrange in between. In some aspects, $255° > \theta_{L2} > 195°$ and $90° > \Phi > 0°$, such as $75° > \Phi > 15°$, or $60° > \Phi > 30°$, or $50° > \Phi > 40°$, or any integer or subrange in between. In some aspects, $240° > \theta_{L2} > 210°$ and $90° > \Phi > 0°$, such as $75° > \Phi > 15°$, or $60° > \Phi > 30°$, or $50° > \Phi > 40°$, or any integer or subrange in between. In some aspects, $230° > \theta_{L2} > 220°$ and $90° > \Phi > 0°$, such as $75° > \Phi > 15°$, or $60° > \Phi > 30°$, or $50° > \Phi > 40°$, or any integer or subrange in between.

The methods and systems described herein may be used with any build material suitable for use in additive printing, as will be known to those of ordinary skill in the art. In some aspects, the build material is a metal powder. In some aspects, the build material is cobalt chrome, stainless steels, tooling steel, maraging steel, aluminum alloys, nickel alloys, copper alloys, or titanium alloys. In some aspects, the build material is cobalt chrome. In some aspects, the build material is a polymer, a ceramic slurry, a metallic slurry, or a metal powder. In some aspects, the polymer is a powdered polymer. Tolerance for angles $\theta_{L1}$ other than 180° will depend on the specific build material used and can be determined by those of ordinary skill in the art (i.e., the definition of "generally opposing" for a given build material will depend on the build material).

The methods of the present disclosure may be used in conjunction with additive printing methods known in the art, including, but not limited to direct metal laser melting (DMLM), stereolithography (SLA), selective laser melting (SLM), and other powder-based processes. In some aspects, the present disclosure is related to a method of fabricating an object using DMLM. In other aspects, the present invention may be used in connection with powder bed e-beam systems where a first and second e-beam are provided over a single powder bed.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. A method of fabricating an object, the method comprising:
   (a) fusing a first portion of a given layer of build material with a first directed energy beam from a first galvo scanner and a second portion of the given layer of build material with a second directed energy beam from a second galvo scanner to form at least one fused region on or over a build plate by irradiation;
   (b) providing a subsequent layer of build material; and
   (c) repeating steps (a) and (b) until the object is formed; the object comprising a surface that is defined by a build vector projecting outward relative to the build plate center at an angle $\Phi$ relative to normal of the build plate such that $90°>\Phi>0°$ and the directed energy beam forms an angle $\theta_{L2}$ relative to normal of the build plate such that $270°>\theta_{L2}>180°$, wherein $\theta_{L2}-\Phi=180°\pm\Delta$, and $\Delta<45°$.

2. The method of claim 1, wherein $\Delta<30°$.
3. The method of claim 1, wherein $\Delta<20°$.
4. The method of claim 1, wherein $\Delta<10°$.
5. The method of claim 1, wherein each of the first and second directed energy beams is a laser beam.
6. The method of claim 1, wherein each of the first and second directed energy beams is an electron beam.
7. The method of claim 1, wherein the build material is a metal powder.
8. The method of claim 1, wherein during the fabricating, $\Phi$ varies between subsequent layers.
9. A method of fabricating an object, the method comprising:
   (a) fusing a first portion of a given layer of metal powder with a first directed energy beam from a first galvo scanner and a second portion of the given layer of metal powder with a second directed energy beam from a second galvo scanner to form at least one fused region on or over a build plate by irradiation;
   (b) providing a subsequent layer of metal powder; and
   (c) repeating steps (a) and (b) until the object is formed; the object comprising a surface that is defined by a build vector projecting outward relative to the build plate center at an angle $\Phi$ relative to normal of the build plate such that $90°>\Phi>0°$ and the laser beam forms an angle $\theta_{L2}$ relative to normal of the build plate such that $270°>\theta_{L2}>180°$, wherein $\theta_{L2}-\Phi=180°\pm\Delta$, and $\Delta<45°$.

10. The method of claim 9, wherein $\Delta<30°$.
11. The method of claim 9, wherein $\Delta<20°$.
12. The method of claim 9, wherein $\Delta<10°$.
13. The method of claim 9, wherein the metal powder is cobalt chrome.
14. The method of claim 9, wherein during the fabricating, $\Phi$ varies between subsequent layers.

15. A method of fabricating an object within an additive powder bed system comprising a build platform, a powder bed defined over the build platform, an energy source configured to produce a directed energy beam, and a galvo scanner provided above the powder bed, the method comprising:
   directing an energy beam from the galvo scanner to fuse a portion of a layer of build material within the powder bed to form an object, wherein the object comprises a surface that is defined by a build vector projecting outward relative to the build plate center at an angle $\Phi$ relative to normal of the build plate such that $90°>\Phi>0°$ and the directed energy beam forms an angle $\theta_{L2}$ relative to normal of the build plate such that $270°>\theta_{L2}>180°$, wherein $\theta_{L2}-\Phi=180°\pm\Delta$, and $\Delta<45°$,
   wherein the energy source comprises a first energy source configured to produce a first directed energy beam toward a first galvo scanner and a second energy source configured to produce a second directed energy beam toward a second galvo scanner.

16. The method of claim 15, wherein the energy source is a laser source.
17. The method of claim 15, wherein the directed energy beam is an electron beam.

* * * * *